(12) United States Patent
Vemuri

(10) Patent No.: US 9,017,441 B1
(45) Date of Patent: Apr. 28, 2015

(54) DEBRIS HANDLING APPARATUS FOR A VACUUM CLEANER

(75) Inventor: Shanti K. Vemuri, Tulsa, OK (US)

(73) Assignee: Christy, Inc., Tulsa, OK (US)

( * ) Notice: Subject to any disclaimer, the term of this patent is extended or adjusted under 35 U.S.C. 154(b) by 1823 days.

(21) Appl. No.: 12/315,406

(22) Filed: Dec. 3, 2008

Related U.S. Application Data

(63) Continuation-in-part of application No. 11/655,505, filed on Jan. 19, 2007, now abandoned.

(51) Int. Cl.
*B01D 45/18* (2006.01)
*A47L 9/12* (2006.01)
*A47L 9/16* (2006.01)
*A47L 9/20* (2006.01)

(52) U.S. Cl.
CPC ............... *B01D 45/18* (2013.01); *A47L 9/125* (2013.01); *A47L 9/1683* (2013.01); *A47L 9/20* (2013.01)

(58) Field of Classification Search
USPC ......... 15/347; 55/428, 429, 432, 433, DIG. 2, 55/DIG. 3, DIG. 18, DIG. 26
See application file for complete search history.

(56) References Cited

U.S. PATENT DOCUMENTS

| | | |
|---|---|---|
| 2,670,008 A | 2/1954 | Kopp |
| 3,895,929 A * | 7/1975 | Jysky et al. ................ 55/334 |
| 4,121,915 A | 10/1978 | Anderson |
| 4,718,924 A | 1/1988 | DeMarco |
| 4,790,865 A | 12/1988 | DeMarco |
| 5,000,767 A | 3/1991 | Sanders et al. |
| 6,818,033 B2 | 11/2004 | North |
| 6,833,016 B2 | 12/2004 | Witter |
| 6,936,085 B2 | 8/2005 | DeMarco |
| 2002/0078524 A1 | 6/2002 | Schroter |
| 2006/0016162 A1 | 1/2006 | Lin |
| 2006/0207230 A1 | 9/2006 | DeMarco |

OTHER PUBLICATIONS

PCT Notification of Transmittal of the International Search Report and the Written Opinion of the International Searching Authority, or the Declaration with reference to App. No. PCT/US08/00719; Mail Date: Nov. 7, 2008.
International Preliminary Report on Patentability issued by the International Bureau on Jul. 30, 2009 in corresponding application PCT/US08/00719; 5 pages.

* cited by examiner

*Primary Examiner* — Duane Smith
*Assistant Examiner* — Sonji Turner
(74) *Attorney, Agent, or Firm* — Gable Gotwals

(57) ABSTRACT

A dual storage dust collector for a vacuum cleaner has a hopper for receiving the dust from the vacuum and a dump tank for receiving the dust from the hopper. A valve between the hopper and the dump tank is operable whether or not the vacuum is running. Thus, whenever the valve is open, dust falls from the hopper into the dump tank and, whenever the valve is closed, the dump tank can be disconnected from the hopper and emptied without interruption of the vacuuming process. In another embodiment, the dump tank can be replaced by a disposable bag filled directly from the valve.

10 Claims, 11 Drawing Sheets

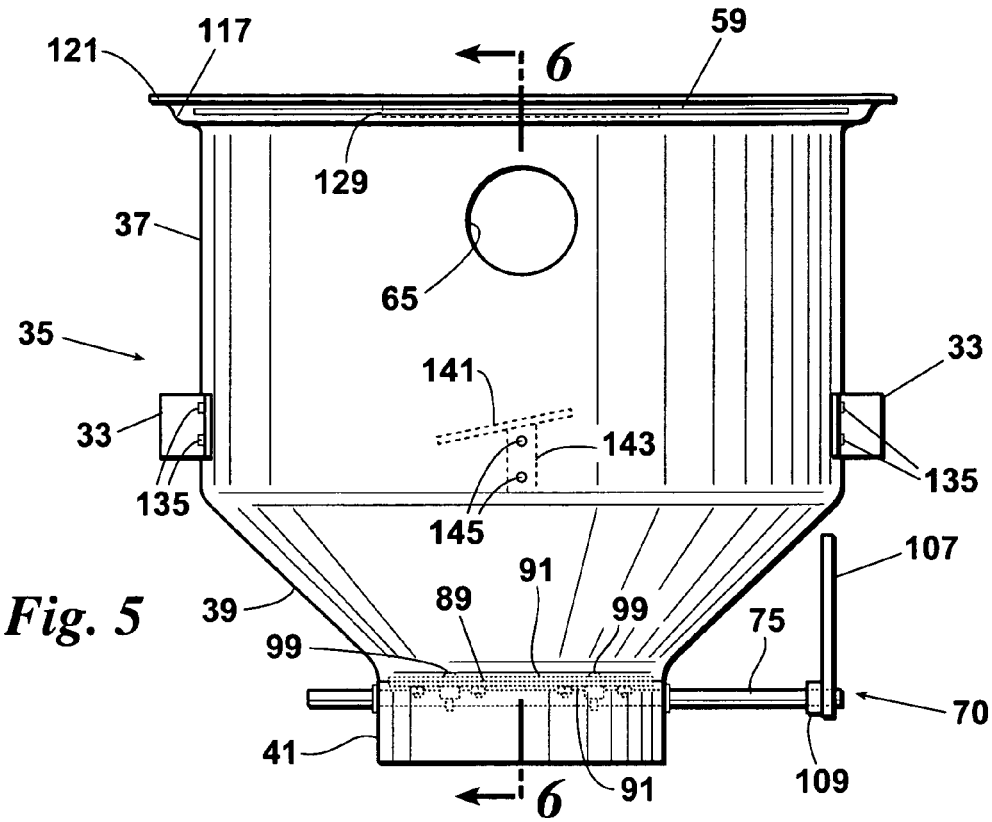
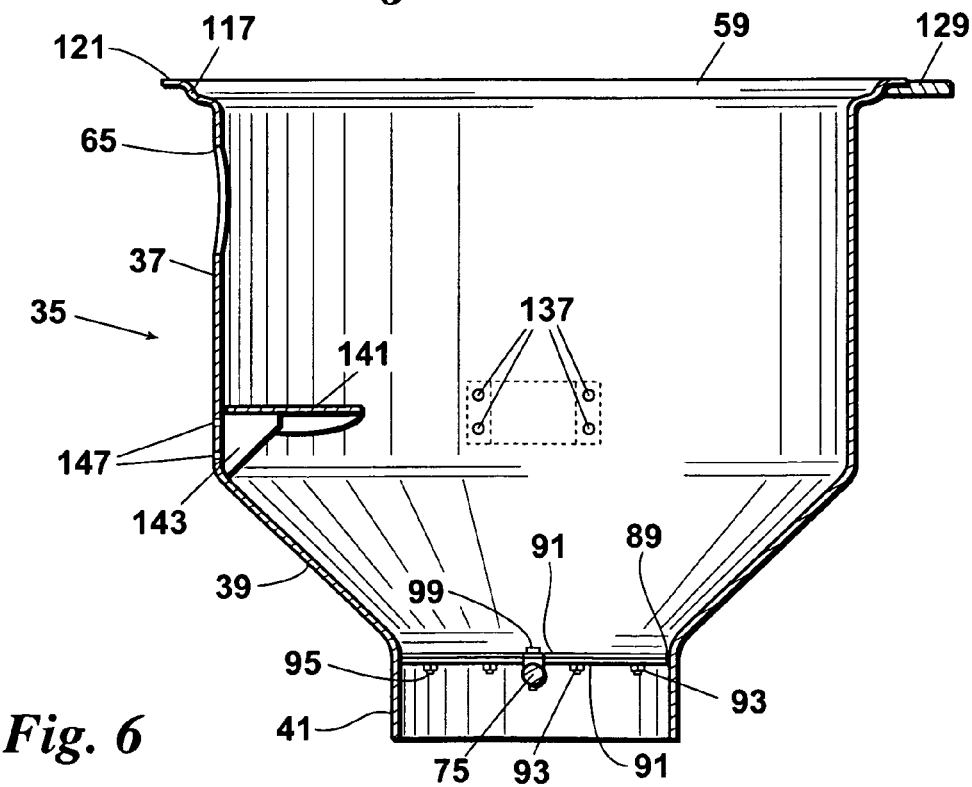

DEBRIS HANDLING APPARATUS FOR A VACUUM CLEANER

REFERENCE TO PENDING APPLICATION

This application is a continuation-in-part application claiming priority to U.S. patent application Ser. No. 11/655,505 filed Jan. 19, 2007.

BACKGROUND OF THE INVENTION

This invention relates generally to vacuum cleaning systems and more particularly concerns dual storage dust collectors used with many such systems.

Presently, an upper hopper and lower dump tank or disposable bag are separated by a flapper or gate pivoting on an offset axis with a weight below one side of the axis. The hopper and tank or bag taken together form a single sealed container with the flapper between the tanks. While the hopper and the tank or bag are connected, they are at equalized pressure and the weight tends to hold the flapper closed so that collected dust settles on the closed flapper. When the collected dust overcomes the weight, the flapper drops to deposit settled dust into the dump tank or bag. When sufficient dust has fallen to allow the weight to regain domination of the balance of the system, the flapper closes until the dust again overcomes the weight. Thus, the flapper is continuously bobbing during the operation of the vacuum.

The flapper assembly does not pneumatically seal the hopper from the tank or bag. Consequently, as long as the hopper and the tank or bag remain properly sealed at their connection point, the pressure in the hopper and the tank or bag remains equalized and dust settled on the flapper falls by gravity into the tank or bag. In tank-type collectors, the tank must be removed in order to empty the tank. In bag-type collectors, the disposable bag must be removed from the assembly and tied to seal the bag and a new disposable bag mounted on the assembly. But if the tank or bag were removed while the vacuum was operating, the vacuum would at least momentarily and probably continuously draw additional ambient air through the opening where the tank or bag had been connected to the hopper and through the unsealed portions of the flapper assembly. This would stir up and circulate dust from the tank or bag into the air, returning some of the dust to the cleaned environment. It would also reduce the vacuum power of the unit because of the increase in total area through which ambient air is admitted to the system. Therefore, these vacuum systems are always shut down before the dump tank or bag is removed and remain out of service until the dump tank or a new bag is reconnected. In dust intensive applications, such as in floor grinding and wall sanding operations, the dump tank or bag must be frequently emptied, perhaps multiple times per hour, especially in trades in which workers have contractually established maximum weight-carry limitations. The down time for workers and vacuum equipment while tanks are emptied or bags are replaced can be a considerable proportion of a work day.

It is, therefore, an object of this invention to provide a vacuum cleaner dust collector that can be emptied or replaced while the vacuum is operating. Another object of this invention is to provide a vacuum cleaner dust collector that controls the use of its dust disposal operation independently of the operation of the vacuum cleaner. A further object of this invention is to provide a vacuum cleaner dust collector that is less likely to re-circulate collected dust to the atmosphere during emptying than known dust collectors. It is also an object of this invention to provide a vacuum cleaner dust collector that can be divided into pneumatically separate compartments.

SUMMARY OF THE INVENTION

In accordance with the invention a dust collector for a vacuum is provided which has a hopper for receiving the dust from the vacuum and a dump tank for receiving the dust from the hopper. A valve is connected in a pneumatically discrete path between the hopper and the dump tank. The valve is operable between a first position in which the pneumatically discrete path is opened and a second position in which the pneumatically discrete path is closed. In the opened condition, the hopper and the dump tank are at equalized pressure and dust in the hopper falls by force of gravity into the dump tank. In the closed condition, the hopper and the dump tank are pneumatically separated and the dump tank can be removed from the hopper, emptied, and reconnected to the hopper. The valve is operated, preferably manually, externally of the dust collector and independently of the operating status of the vacuum. The valve is not responsive to the operating status of the vacuum. Therefore, the dust in the hopper can be deposited into the dump tank and the dump tank can be emptied without interrupting the operation of the vacuum cleaner.

In another embodiment of the invention, a debris handling apparatus facilitates transfer of particulates collected in the vacuum cleaner hopper directly into a disposable bag rather than into a dump tank. In the disposable bag embodiment, as with the dump tank embodiment, the discharge valve is operable between the first position in which the discharge chute of the hopper is closed to pneumatic flow and the second position in which the discharge chute of the hopper is open to pneumatic flow. But, in the disposable bag embodiment, a duct has an inlet end contoured to contain the discharge end of the hopper discharge chute. The duct is sized to provide an air passage between the outside wall of the chute and the inside wall of the duct. The duct has an outlet end contoured to be inserted into the mouth of the bag. The inside wall of the mouth of the bag is held against the outside wall of the duct so as to prevent pneumatic flow between the bag and the duct. This can be accomplished, for example, by resiliently stretching an elastic band to gird the duct inlet end with the mouth of the bag between the duct and the elastic band. In this configuration, ambient air is drawn through the air passage between the hopper discharge chute and the duct, so the bag is not collapsed by the operation of the vacuum cleaner.

As illustrated, the duct inlet end is concentric with the hopper discharge chute, creating a concentric air-passing annulus. The duct outlet end is concentrically larger than the duct inlet end. The duct inlet and outlet ends are cylindrical and connected by a tapered mid-portion. A level detector or other means may be used for indicating that a threshold quantity of particulate has been collected in the hopper. Similarly, a level detector or other means may be used for indicating that a threshold quantity of particulate has been collected in the bag.

BRIEF DESCRIPTION OF THE DRAWINGS

Other objects and advantages of the invention will become apparent upon reading the following detailed description and upon reference to the drawings in which:

FIG. 5 is a front elevation of the hopper and valve of the dust collector of the vacuum cleaner of FIG. 1;

FIG. 6 is a cross-sectional view taken along the line 6-6 of FIG. 5;

While the invention will be described in connection with a preferred embodiment thereof, it will be understood that it is not intended to limit the invention to that embodiment or to the details of the construction or arrangement of parts illustrated in the accompanying drawings.

DETAILED DESCRIPTION

Figure 1:
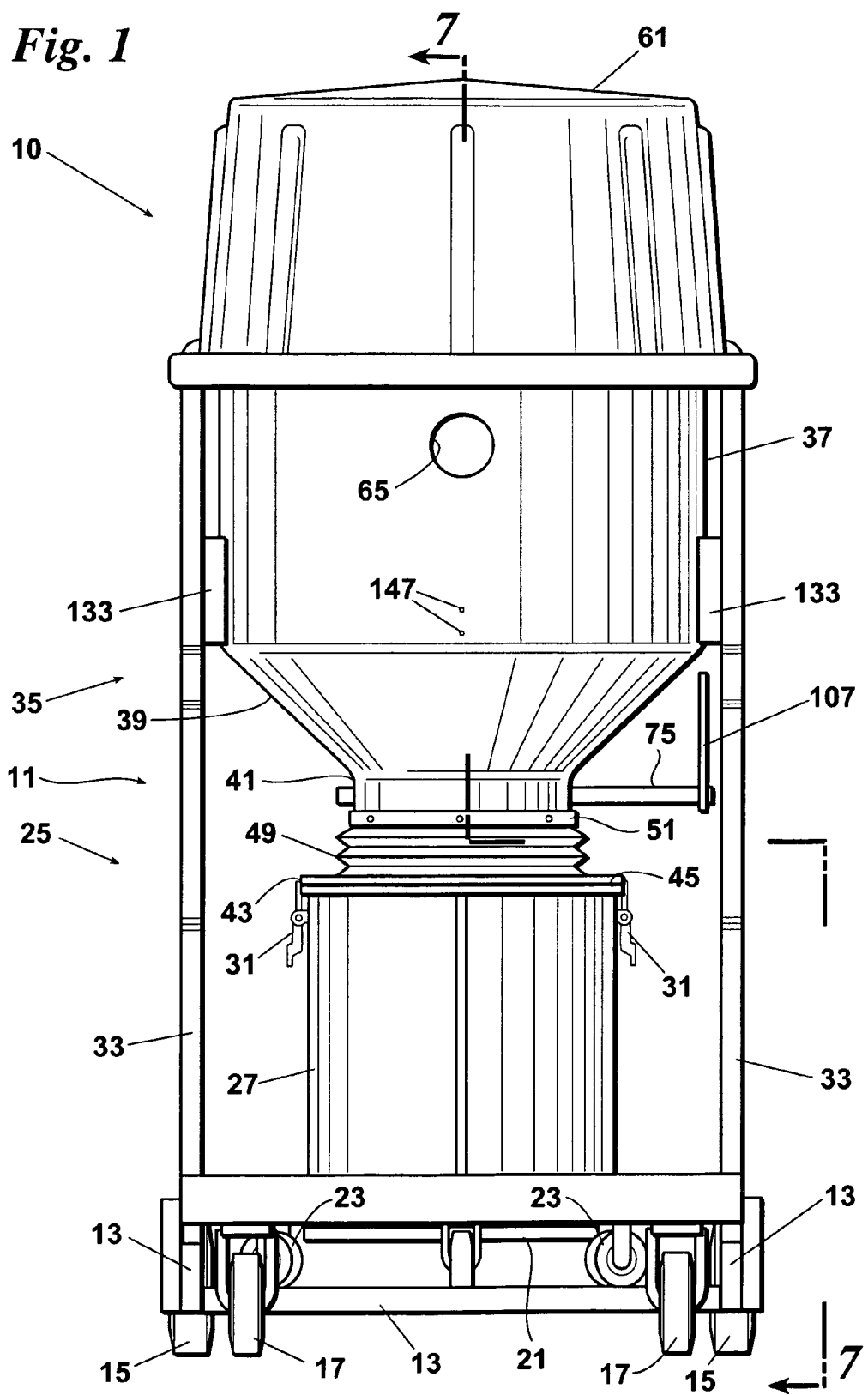
FIG. 1 is a front elevation view of a vacuum cleaner with a dual storage dust collector.
Figure 7:
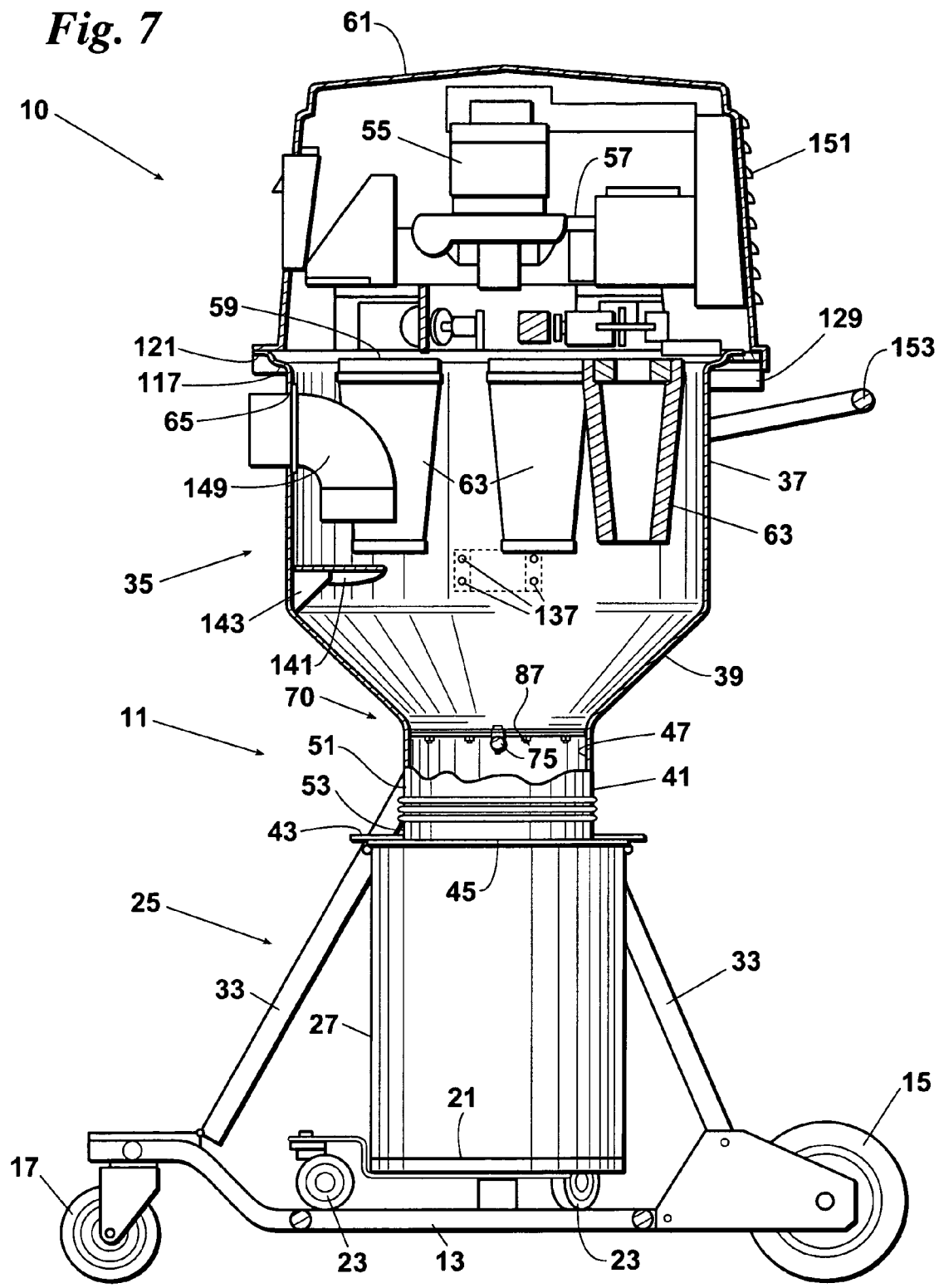
FIG. 7 is a cross-sectional view taken along the line 7-7 of FIG. 1.

Turning first to FIGS. 1 and 7, a vacuum cleaner 10 is illustrated which incorporates a dual storage dust collector 11. The vacuum cleaner 10 has a chassis 13 with a pair of rear wheels 15 for moving the vacuum cleaner 10 to and from areas to be vacuumed and two casters 17 which allow the vacuum cleaner 10 to roll and change direction during vacuuming.

A platform 21 which rolls on four casters 23 onto and from the chassis 13 of the vacuum cleaner 10 supports the lower portion 25 of the dust collector 11. The lower portion 25 of the dust collector 11, as shown, includes a cylindrical dump tank 27 with an open top 29 and a pair of diametrically opposed cam-over clamps 31.

A frame 33 extending upwardly from the chassis 13 supports the upper portion 35 of the dust collector 11. The upper portion 35 of the dust collector 11 includes a barrel 37, a hopper 39 and a neck 41. The barrel 37 extends downwardly to the hopper 39 which in turn extends downwardly to the neck 41.

To detachably connect the upper and lower portions 35 and 25 of the dust collector 11 into a single, pneumatically discrete container, a cover plate 43 sized to overlap the upper rim 45 of the dump tank 27 has an upwardly extending annular flange 47. The upper end of a flex connector 49 is mounted by a first clamp 51 to the lower end of the hopper neck 41 and the lower end of the flex connector 49 is mounted by a second clamp 53 to the dump tank cover plate flange 47. When the dump tank platform 21 is rolled onto the vacuum cleaner chassis 13 and the hopper neck 41 and dump tank cover plate flange 47 are aligned, the flex connector 49 can be extended to seat the cover plate 43 on the dump tank rim 45. The cam-over clamps 31 can then be snapped closed to seal the plate 43 against the tank rim 45.

The powered operating components of the vacuum cleaner 10, including the motor 55 and valves 57, are mounted on a plate 59 seated on top of the barrel 37 and protected by a cover 61. The vacuum filters 63 are suspended below the plate 59 in the barrel 37. The vacuum intake 65 extends through the upper front wall of the barrel 37.

The hopper 39 receives the dust collected in the barrel 37 by the vacuum cleaner 10 and the dump tank 27 receives the dust from the hopper 39. To permit separation of the dump tank 27 from the hopper 39, an isolation valve 70 is connected in a pneumatically discrete path between the hopper 39 and the dump tank 27. The valve 70 is operable between a first position in which the pneumatically discrete path is opened and a second position in which the pneumatically discrete path is closed. In the opened condition, the hopper 39 and the dump tank 27 are at equalized pressure and dust in the hopper 39 falls by force of gravity into the dump tank 27. In the closed condition, the hopper 39 and the dump tank 27 are pneumatically separated and the dump tank 27 can be removed from the hopper 39, emptied, and reconnected to the hopper 39. The valve 70 is operated, preferably manually, externally of the dust collector 11 and independently of the operating status of the vacuum cleaner 10. The valve 70 is not responsive to the operating status of the vacuum cleaner 10. Therefore, the dust in the hopper 39 can be deposited into the dump tank 27 and the dump tank 27 can be emptied without interrupting the operation of the vacuum cleaner 10.

As seen in FIGS. 2-6, the isolation valve 70 is mounted in the neck 41 of the hopper 39. A pair of bushings 71 are disposed in diametrically opposed openings 73 in the upper portion of the neck 41. A shaft 75 extending through the bushings 71 is secured in the neck 41 by snap rings 77 engaged in grooves 79 on the circumference of shaft extensions outside of the neck 41. The shaft 75 has a pair of co-planar spaced apart flats 81 with threaded holes 83 centered on the flats 81 and extending through the shaft 75. As shown, the flats 81 are equally displaced from the center of the neck 41 when the shaft 75 is mounted in the bushings 71. Each flat 81 seats a cylindrical stand-off 85. The end faces of the stand-offs 85 are co-planar. A circular valve plate 87 is formed by sandwiching a concentrically larger polyurethane seal 89 between a pair of metal discs 91 and securing the laminar arrangement together with nuts 93 and bolts 95. A positive-lock wire 97 may be serially engaged from bolt 95 to bolt 95 to assure that the bolts 95 cannot rotate to loosen the laminar layers of the plate 87. The valve plate 87 is seated on the stand-offs 85 and fastened to the valve shaft 75 using bolts 99 and washers 101. The diameter of the metal layers 91 of the plate 87 are small enough to permit rotation of the plate 87 and shaft 75 in the neck 41 and the diameter of the polyurethane layer 89 is great enough to pneumatically seal the valve plate 87 along the inner wall of the neck 41 when the valve plate 87 is rotated to a plane perpendicular to the center axis 105 of the neck 41. One end of the shaft 75 is extended outwardly to a valve handle 107. As shown, the valve handle 107 is a yoke shaped member with a sleeve 109 at its apex 111 for receiving the shaft 75. A set screw 113 extends radially through the sleeve 109 to a another flat 115 in the valve shaft 75 to lock the handle 107 to the shaft 75. The valve plate 87 is manually rotatable for 90 degrees between horizontal and vertical orientations, the horizontal orientation being the sealed perpendicular or closed position above described and the vertical orientation being a fully opened position in which the plate 87 is parallel to the center axis 105 of the neck 41.

Figure 2:
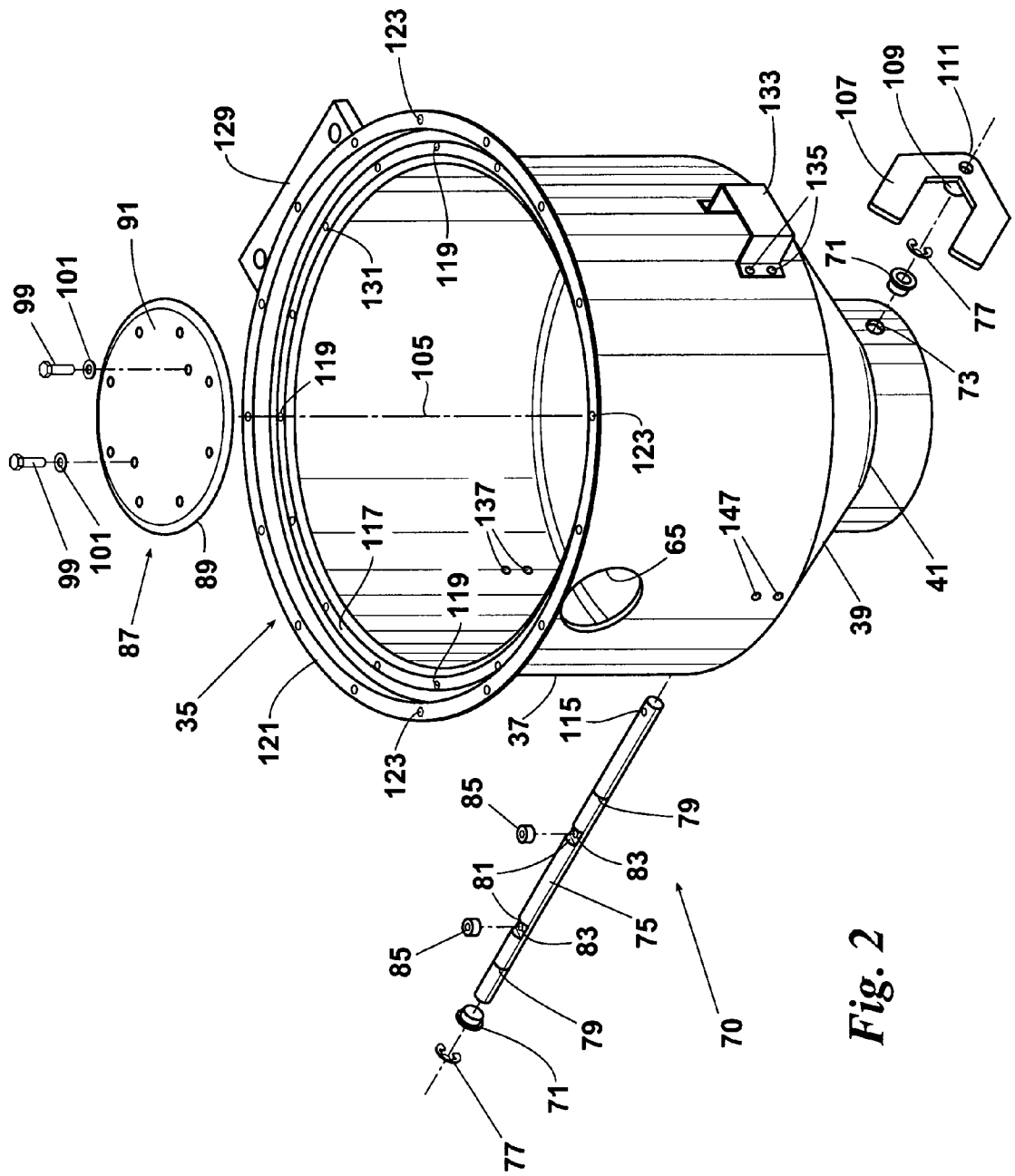
FIG. 2 is a perspective assembly view of the hopper and valve of the dust collector of the vacuum cleaner of FIG. 1.
Figure 4:
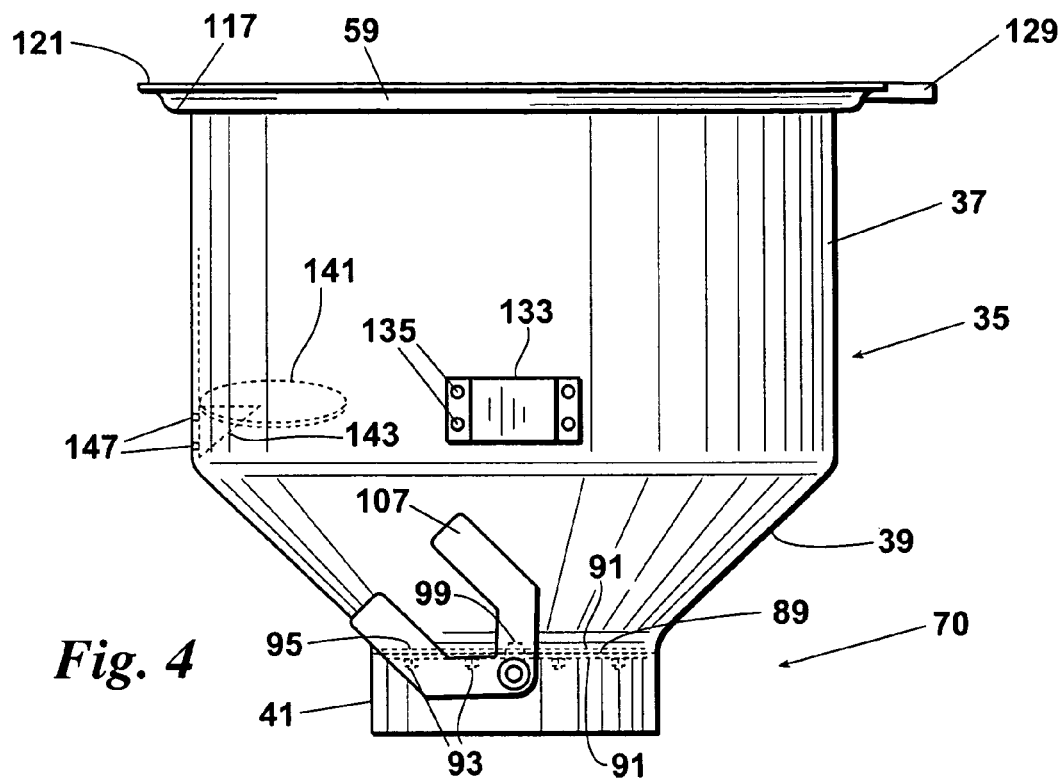
FIG. 4 is a side elevation view of the hopper and valve of the dust collector of the vacuum cleaner of FIG. 1.
Figure 3:
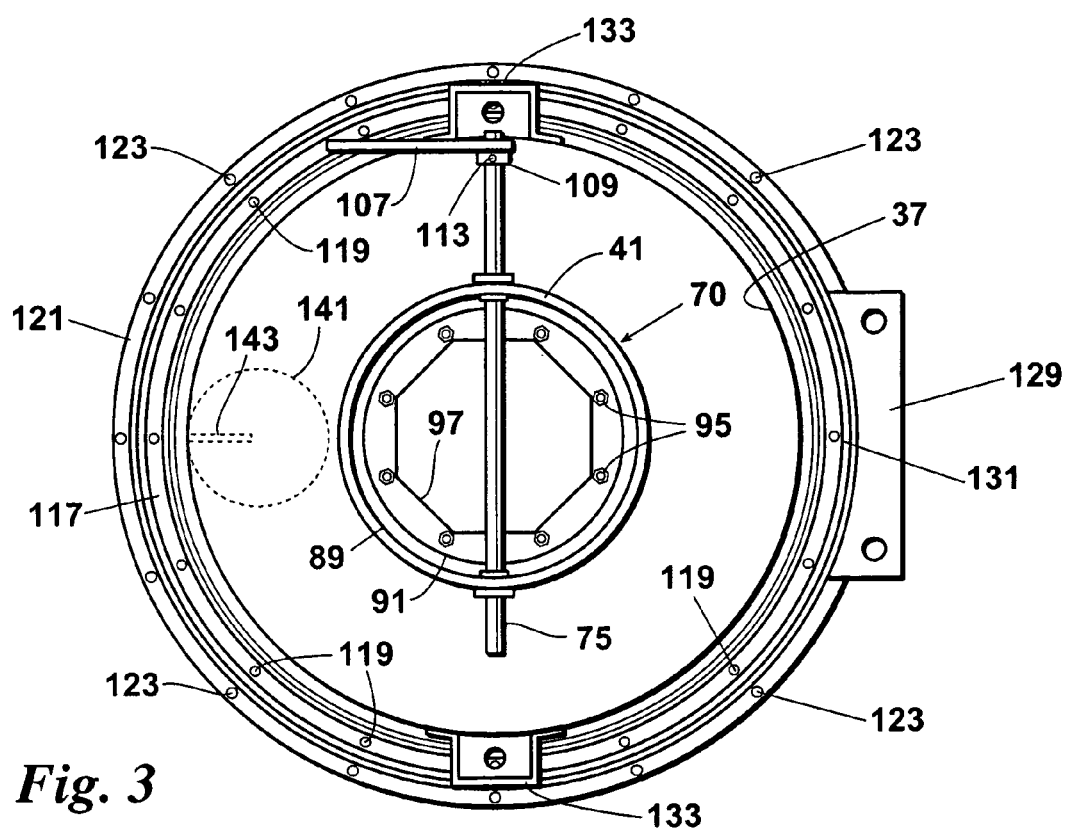
FIG. 3 is a top plan view of the hopper and valve of the dust collector of the vacuum cleaner of FIG. 1.

As best seen in FIG. 2, the top of the barrel 37 of the upper portion 35 of the dust collector 11 has an annular seat 117 with apertures 119 and an outer annular flange 121 with apertures 123. The vacuum cleaner mounting plate 59, seen in FIG. 7, can be fastened in the seat 117 by screws (not shown) with a closed cell foam gasket 125 between the seat 117 and the plate 59 to pneumatically seal the barrel 37 to plate 59 connection. The vacuum cleaner cover 61 can be secured to the barrel 37 by screws (not shown) into the aperture 123 in the barrel flange 121. Preferably, the barrel 37, hopper 39 and neck 41 are of unitary construction so that no seals are required in the upper portion components. The bushings 71 in the neck 41 are made of brass, sealing the mounting holes 73 for the shaft 75. A closed cell foam gasket 127 is also sandwiched between the dump tank rim 45 and the dump tank cover plate 43 to pneumatically seal this connection. Thus, when the valve 70 is in the opened condition, the pressure in the upper and lower components 35 and 25 of the dust collector 11 is substantially equalized and dust collected in the hopper 39 will fall under the force of gravity into the dump tank 27. When the valve 70 is in the closed condition, the pneumatically discrete path between the hopper 39 and the dump tank 27 is also pneumatically sealed, so that the dump tank 27 can be disconnected from the hopper 39 without turning off the vacuum cleaner 10, without any significant loss of vacuum power and without releasing any significant amount of collected dust into the atmosphere.

To complete the vacuum cleaner 10, a flange 129 diametrically opposite the vacuum intake 65 is radially extended outwardly from the barrel 37 below the barrel flange 121 and the cover 61 is contoured to be aligned on the radial flange 129. A locating key 131 on the barrel seat 117 engages in a dimple (not shown) on the bottom of the vacuum cleaner mounting plate 59. When the cover 61 is aligned on the radial flange 129 and the plate 59 is aligned on the locating key 131, the exhaust system of the vacuum cleaner 10 is properly aligned. Diametrically opposed brackets 133 fixed to the exterior of the barrel 37 by screws 135 through holes 137 in the barrel 37 facilitate mounting the upper portion 35 of the dust collector 11 on the frame 33. As best seen in FIG. 7, an angled baffle, preferably of unitary construction with a bracket 143, is mounted inside the barrel 37 directly below the vacuum intake 65 by use of screws 147 through holes 145 in the barrel 37. An elbow 149 at the vacuum intake 65 directs incoming air and dust at the baffle 141, so that a vortex of air flow occurs in the barrel 37 above the baffle 141 and turbulence in the lower part of the barrel 37 and the hopper 39, if any, is reduced. The vacuum cleaner exhaust passes through vents 151 in the cover 65. A handle 153 mounted on the barrel 37 below the radial flange 129 facilitates tipping the vacuum cleaner 10 on its rear wheels 15 to move the unit from location to location. The vacuum cleaner 10 has been described in reference to a small, portable, commercial model approximately 2' wide by 4' deep by 5' high. However, the principles of dual storage herein disclosed may also be applied to permanent industrial vacuums many stories in height.

In another embodiment, the lower portion 25 of the dust collector 11, as seen in FIGS. 1 and 7, is replaced by a debris handling apparatus 210, seen in FIGS. 8-13, by which particulates collected in the vacuum cleaner hopper 39 are transferred directly into a disposable bag 240 rather than into the dump tank 27.

The upper portion 35 of the disposable bag embodiment is substantially the same as is shown in FIGS. 1 and 7 and, in particular, includes the barrel 37, the hopper 39, the hopper discharge chute or neck 41 and the discharge or isolation valve 70 as seen in FIGS. 2-6. The discharge valve 70 is operable between its first position in which the discharge chute 41 of the hopper 39 is closed to pneumatic flow and its second position in which the discharge chute 41 of the hopper 39 is opened to pneumatic flow.

Figure 8:
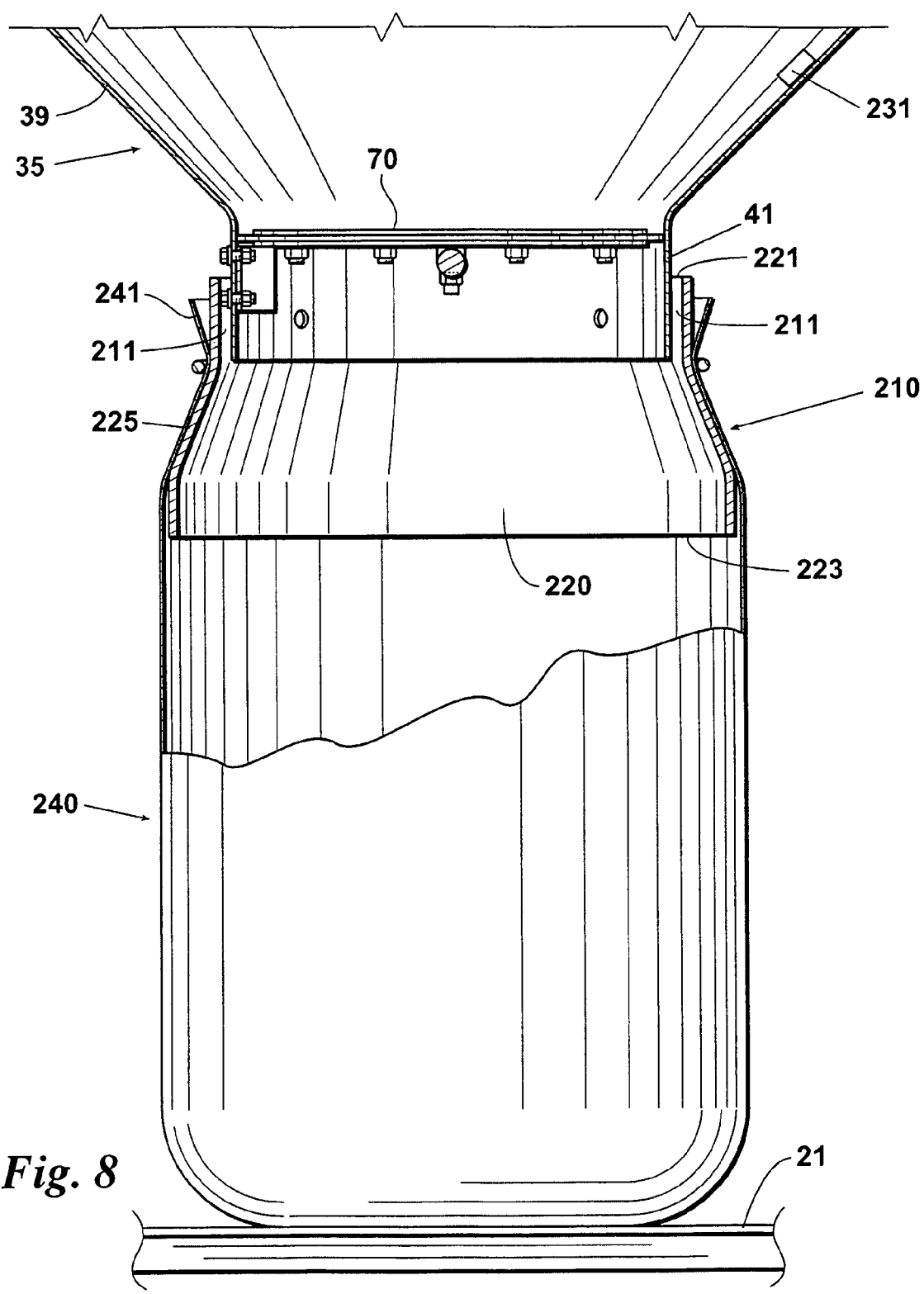
FIG. 8 is a diametric cross-sectional view of the lower portion of the dust collector of the disposable bag embodiment of the invention.
Figure 9:
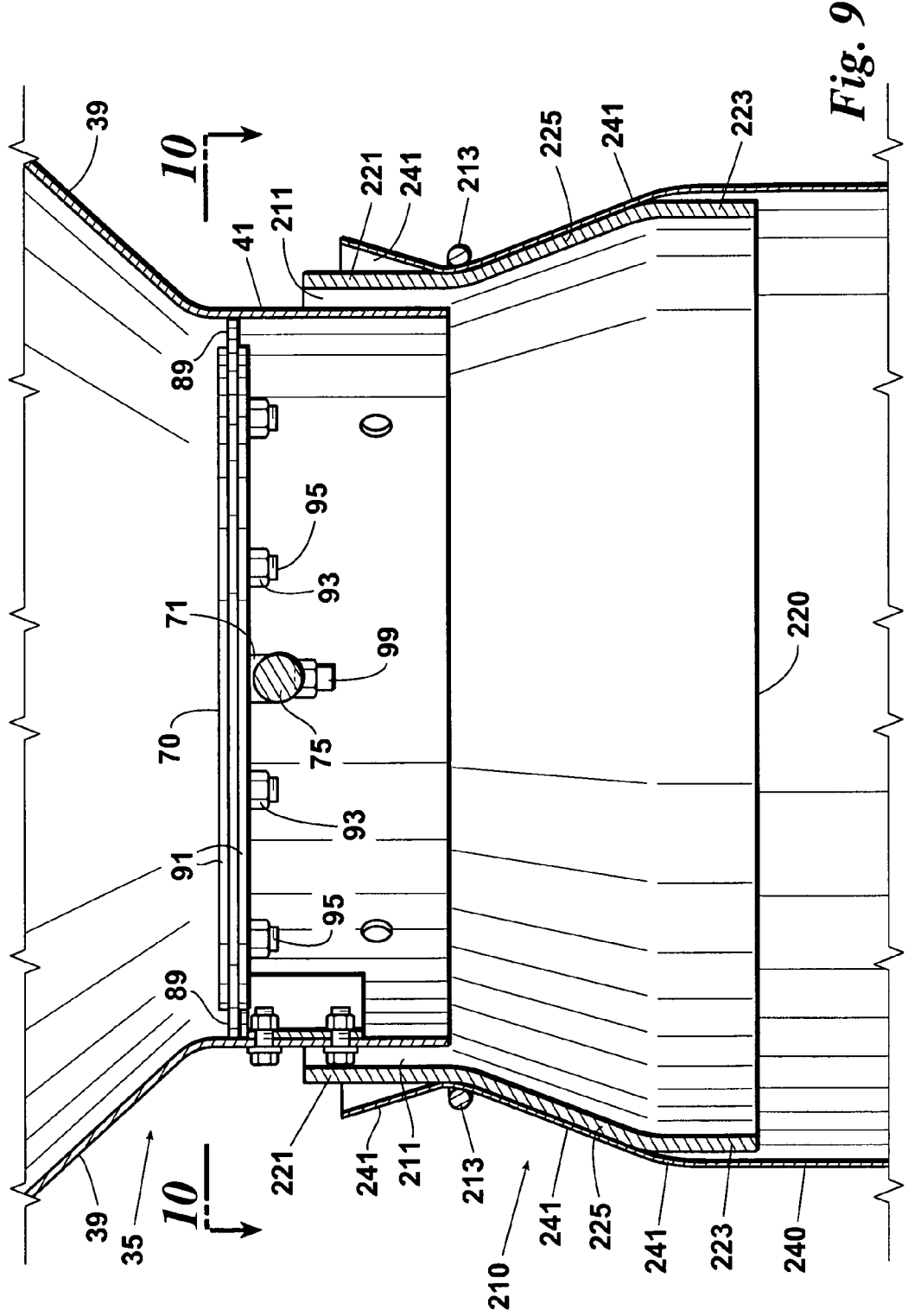
FIG. 9 is an exploded diametric cross-sectional view of the debris handling apparatus of the dust collector lower portion of FIG. 8.
Figure 10:
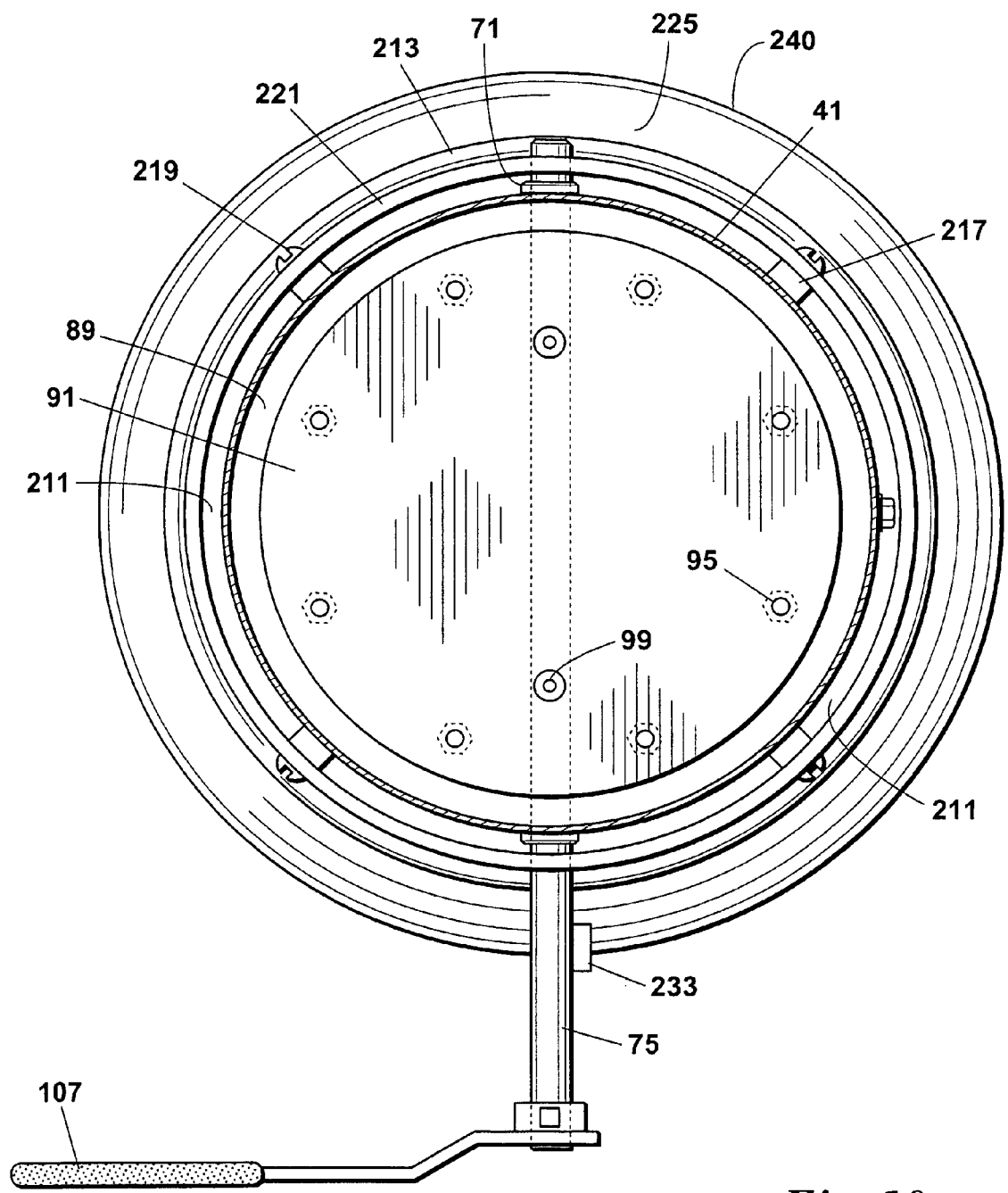
FIG. 10 is a cross-sectional view taken along the line 10-10 of FIG. 9.

As seen in FIGS. 8-10, a duct 220 has an inlet end 221 contoured to receive the end of the discharge chute 41 of the hopper 39 with an air passage 211 between the outside wall of the discharge chute 41 and the inside wall of the duct 220. The duct outlet end 223 is contoured to be inserted into the mouth 241 of the bag 240. The inside wall of the mouth 241 of the bag 240 is held against the outside wall of the duct 220 so as to prevent pneumatic flow between the bag 240 and the duct 220. This can be accomplished, for example, by resiliently stretching an elastic band 213 to gird the duct inlet end 221 with the mouth 241 of the bag 240 between the duct 220 and the elastic band 213.

Figure 11:
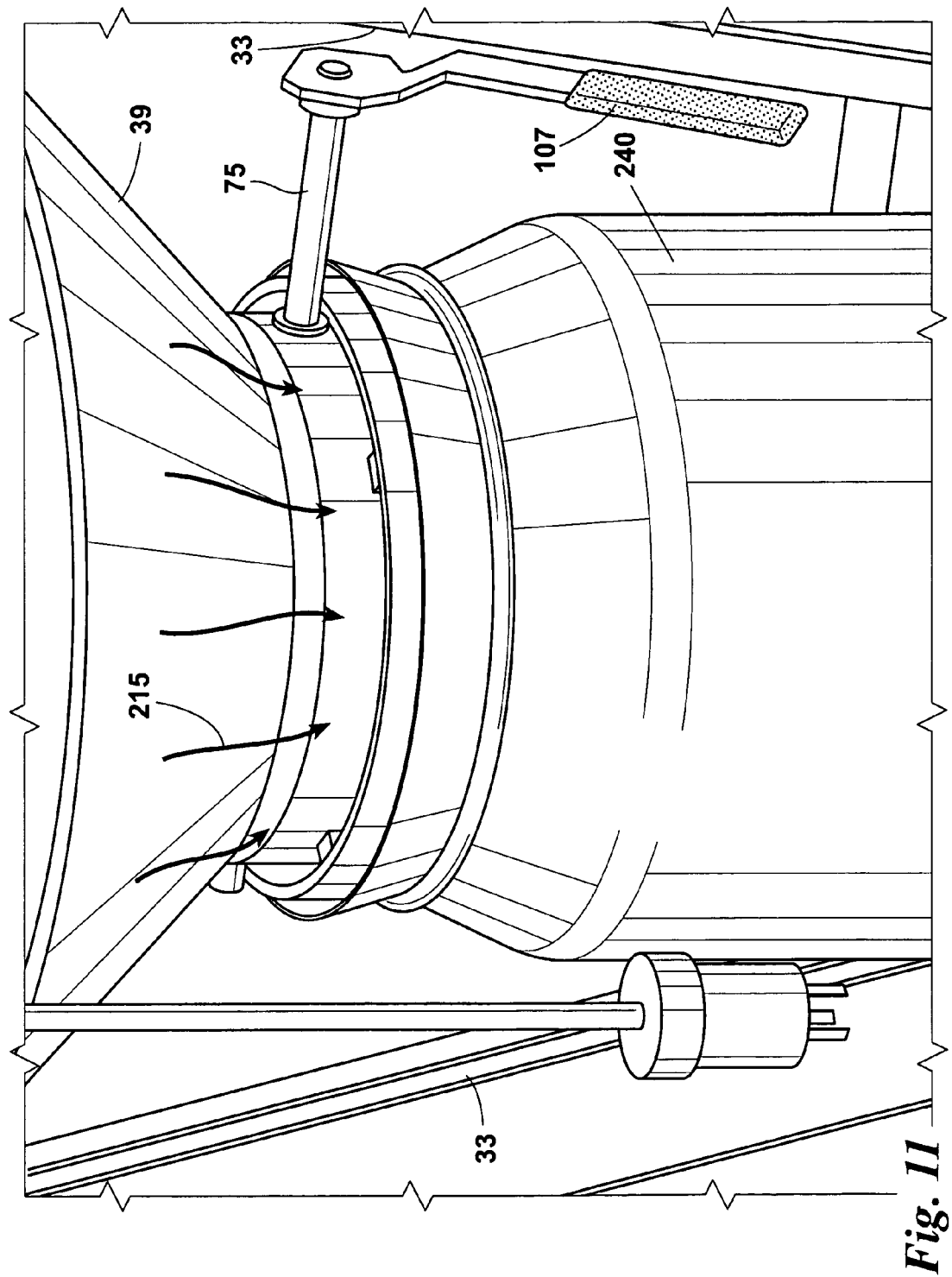
FIG. 11 is a partial perspective view illustrating the operational air flow pattern of the debris handling apparatus of the embodiment of FIG. 8 in the valve-opened condition.
Figure 12:
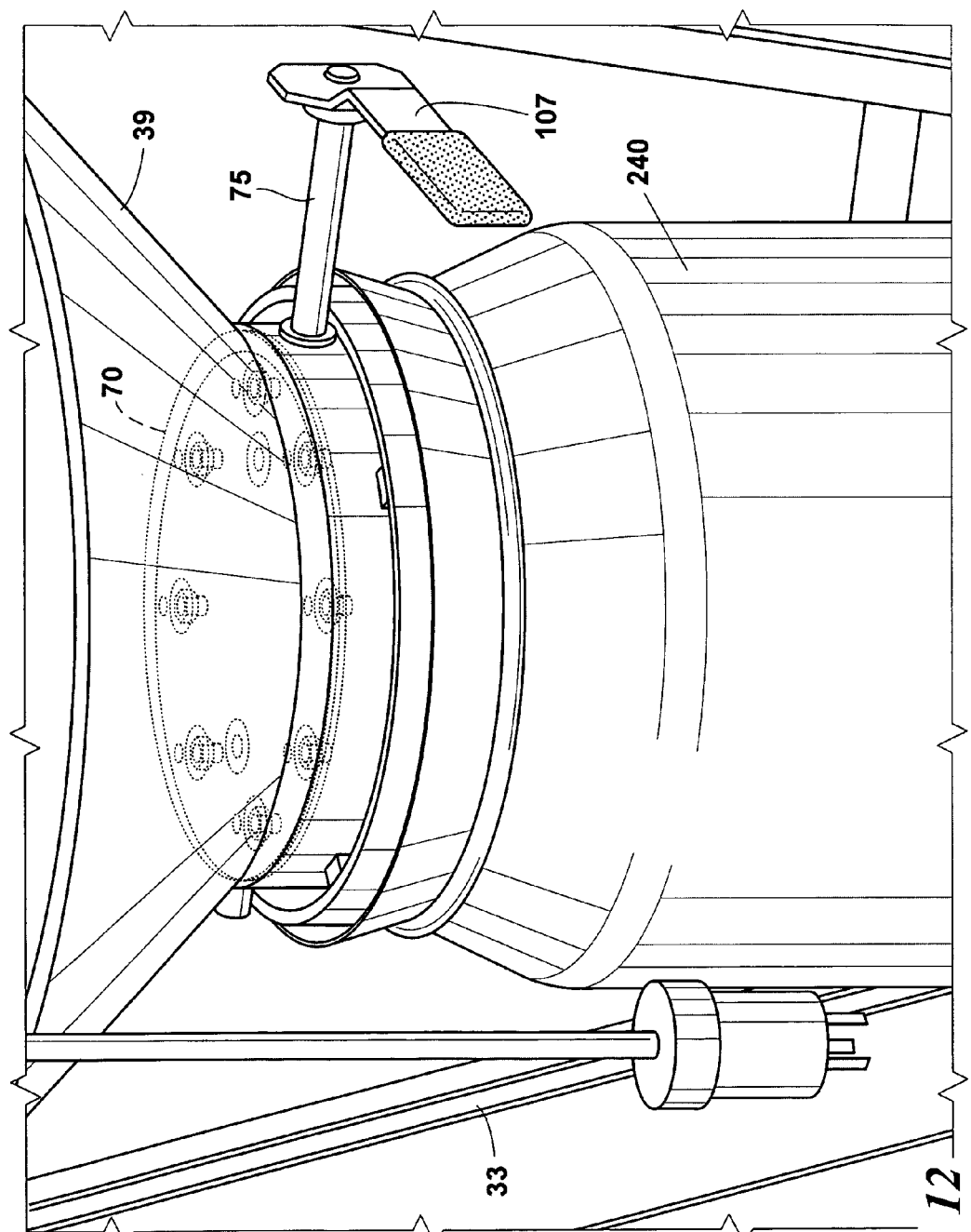
FIG. 12 is a partial perspective view illustrating the valve-closed condition of the debris handling apparatus of the embodiment of FIG. 8.
Figure 13:
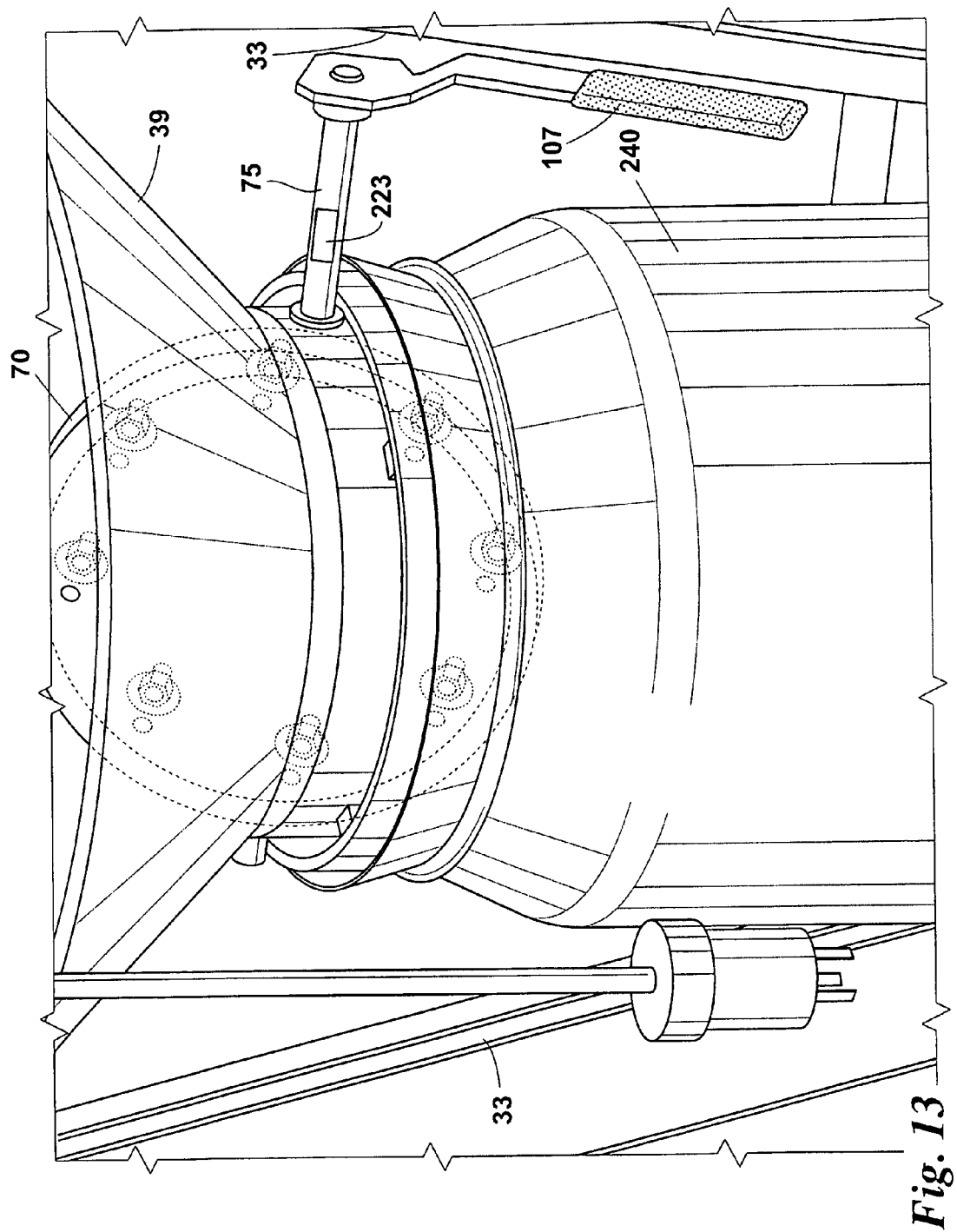
FIG. 13 is a partial perspective view illustrating the valve-opened condition of the debris handling apparatus of the embodiment of FIG. 8.

As in the dump tank embodiment of FIGS. 1-7, during operation of the vacuum cleaner with the valve 70 in the closed condition as seen in FIG. 12, the valve 70 seals the hopper discharge chute 41 against pneumatic flow and collected particulates are stored above the valve 70. Therefore, no negative pressure is applied the bag 240. When the valve 70 is opened to discharge the collected particulates into the bag 240, operation of the vacuum creates negative pressure in the discharge chute 41 which would cause the bag 240 to collapse. However, as seen in FIG. 11, during operation of the vacuum cleaner with the valve 70 in the opened condition as seen in FIG. 13, the debris handling apparatus 210 allows ambient air 215 to be drawn through the air passage 211 between the hopper discharge chute 41 and the duct 220 rather than from the bag 240, so the bag 240 will not be collapsed by the vacuum created by the vacuum cleaner.

Using this disposable embodiment, the vacuum cleaner can operate continuously while the valve 70 is closed, even if the bag 240 is disconnected from the duct 220 for replacement, and while the valve 70 is opened to discharge collected particulates from the hopper 39 to the bag 240

Looking at FIGS. 9 and 10, the duct inlet end 221 is concentric with the hopper discharge chute 41, creating a concentric air-passing annulus 211. The duct outlet end 223 is concentrically larger than the duct inlet end 221. The duct inlet and outlet ends 221 and 223 are cylindrical and connected by a tapered mid-portion 225. The tapered mid-portion affords a bell shape which helps to support the bag 240 which drapes over and is held against the duct 220 by the elastic band 213. The air passage 211 between the inlet end 221 of the duct 220 and the discharge chute 41 of the hopper 39 is maintained by spacers, as shown four sleeves 217 fastened to the inlet end 221 of the duct 220 with screws 219.

A level detector 231 or other means may be used for indicating that a threshold quantity of particulate has been collected for discharge from the hopper 39. This will reduce the likelihood of recycling collected particulates through the filters. Similarly, a level detector 233 or other means, such as a counter tracking the number of discharges through the valve 70, may be used for indicating that a threshold quantity of particulate has been collected in the bag 240. This will reduce the likelihood that the bag 240 will be filled to levels making the filled bag 240 to difficult for the abilities of the user to manipulate.

As shown in FIG. 8, the bag 240 is seated directly on the vacuum cleaner platform 21. However, the bag 240 could be contained in a canister seated on the platform 21 or be directly supported by the frame 23 or contained in a canister seated on the frame 23.

Thus, it is apparent that there has been provided, in accordance with the invention, a vacuum cleaner with dual storage dust collector that fully satisfies the objects, aims and advantages set forth above. While the invention has been described in conjunction with a specific embodiment thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. For facilitating transfer of particulates collected in a vacuum cleaner hopper into a disposable bag, a debris handling apparatus comprising:

a valve operable between a first position in which a particulate discharge chute of the hopper is closed to pneumatic flow and a second position in which the particulate discharge chute of the hopper is open to pneumatic flow;

a duct having inlet and outlet ends, said duct inlet end being contoured to contain a discharge end of the hopper discharge chute and to provide an air passage between an outside wall of the hopper discharge chute and an inside wall of said duct and said duct outlet end being contoured for insertion into a mouth of the bag; and means for holding an inside wall of the mouth of the bag against an outside wall of said duct so as to prevent pneumatic flow therebetween.

2. A debris handling apparatus according to claim 1, said duct inlet end concentrically containing a discharge end of the hopper discharge chute with an annulus therebetween.

3. A debris handling apparatus according to claim 1, said duct outlet end being concentrically larger than said duct inlet end.

4. A debris handling apparatus according to claim 3, said duct inlet and outlet ends being cylindrical and connected by a tapered mid-portion.

5. A debris handling apparatus according to claim 3, said means for holding comprising an elastic band which, with said duct inserted in the bag, is resiliently stretched when girding said duct inlet end with the mouth of the bag therebetween.

6. A debris handling apparatus according to claim 1 further comprising means for indicating that a threshold quantity of particulate has been collected in the hopper.

7. A debris handling apparatus according to claim 6, said means for indicating comprising a level detector.

8. A debris handling apparatus according to claim 1 further comprising means for indicating that a threshold quantity of particulate has been collected in the bag.

9. A debris handling apparatus according to claim 8, said means for indicating comprising a level detector.

10. For facilitating transfer of particulates collected in a vacuum cleaner hopper into a disposable bag, a debris handling apparatus comprising:

a valve operable between a first position in which a particulate discharge chute of the hopper is closed to pneumatic flow and a second position in which the particulate discharge chute of the hopper is open to pneumatic flow;

a duct having inlet and outlet ends, said duct inlet end being contoured to contain a discharge end of the hopper discharge chute and to provide an air passage between an outside wall of the hopper discharge chute and an inside wall of said duct and said duct outlet end being contoured for insertion into a mouth of the bag; and a band holding an inside wall of the mouth of the bag against an outside wall of said duct so as to prevent pneumatic flow therebetween.

\* \* \* \* \*